(12) United States Patent
Lee et al.

(10) Patent No.: US 10,903,476 B2
(45) Date of Patent: Jan. 26, 2021

(54) BATTERY MODULE AND BATTERY PACK INCLUDING SAME

(71) Applicant: LG CHEM, LTD., Seoul (KR)

(72) Inventors: Jin-Kyu Lee, Daejeon (KR); Dal-Mo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 175 days.

(21) Appl. No.: 16/341,399

(22) PCT Filed: May 25, 2018

(86) PCT No.: PCT/KR2018/005991
§ 371 (c)(1),
(2) Date: Apr. 11, 2019

(87) PCT Pub. No.: WO2019/009519
PCT Pub. Date: Jan. 10, 2019

(65) Prior Publication Data
US 2020/0044228 A1 Feb. 6, 2020

(30) Foreign Application Priority Data
Jul. 6, 2017 (KR) .................. 10-2017-0085992

(51) Int. Cl.
*H01M 4/02* (2006.01)
*H01M 2/34* (2006.01)
(Continued)

(52) U.S. Cl.
CPC ......... *H01M 2/345* (2013.01); *H01M 2/1077* (2013.01); *H01M 2/206* (2013.01);
(Continued)

(58) Field of Classification Search
CPC ....................................................... H01M 4/02
See application file for complete search history.

(56) References Cited

U.S. PATENT DOCUMENTS

| 2013/0017421 A1 | 1/2013 | Onnerud et al. |
| 2013/0075242 A1 | 3/2013 | Lim |

(Continued)

FOREIGN PATENT DOCUMENTS

| JP | 2010-257625 A | 11/2010 |
| JP | 2012-506105 A | 3/2012 |

(Continued)

OTHER PUBLICATIONS

International Search Report (PCT/ISA/210) issued in PCT/KR2018/005991, dated Aug. 29, 2018.

*Primary Examiner* — Jacob B Marks
(74) *Attorney, Agent, or Firm* — Birch, Stewart, Kolasch & Birch, LLP

(57) ABSTRACT

A battery module having a battery cell stack having a plurality of stacked battery cells, each battery cell having an electrode lead, a bus bar configured to electrically connect the electrode leads of the plurality of stacked battery cells, and a breaking unit disposed between two adjacent battery cells of the plurality of stacked battery cells is provided. The breaking unit is spaced apart from the bus bar. The breaking unit is configured to operate by a gas pressure of gas generated in at least one of the two adjacent battery cells to break the electric connection between the electrode leads of the two adjacent battery cells and the bus bar.

16 Claims, 6 Drawing Sheets

(51) Int. Cl.
*H01M 2/10* (2006.01)
*H01M 2/20* (2006.01)
*B60L 50/64* (2019.01)
*B60K 6/28* (2007.10)

(52) U.S. Cl.
CPC ............... *B60K 6/28* (2013.01); *B60L 50/64* (2019.02); *B60Y 2200/91* (2013.01); *B60Y 2200/92* (2013.01); *B60Y 2400/112* (2013.01); *H01M 2200/20* (2013.01); *H01M 2220/20* (2013.01)

(56) References Cited

U.S. PATENT DOCUMENTS

| | | | |
|---|---|---|---|
| 2015/0111089 A1* | 4/2015 | Seo | H01M 2/1061 429/156 |
| 2015/0162593 A1 | 6/2015 | Lee | |
| 2015/0171410 A1 | 6/2015 | Shin | |
| 2015/0171480 A1 | 6/2015 | Seo et al. | |

FOREIGN PATENT DOCUMENTS

| | | |
|---|---|---|
| JP | 2013-73930 A | 4/2013 |
| JP | 2013-536974 A | 9/2013 |
| KR | 10-2009-0043717 A | 5/2009 |
| KR | 10-1449307 B1 | 10/2014 |
| KR | 10-2015-0007017 A | 1/2015 |
| KR | 10-1500222 B1 | 3/2015 |
| KR | 10-1500229 B1 | 3/2015 |
| KR | 10-2015-0071571 A | 6/2015 |
| KR | 10-2017-0038497 A | 4/2017 |
| KR | 10-2017-0074543 A | 6/2017 |
| WO | WO 2009/057893 A1 | 5/2009 |

* cited by examiner

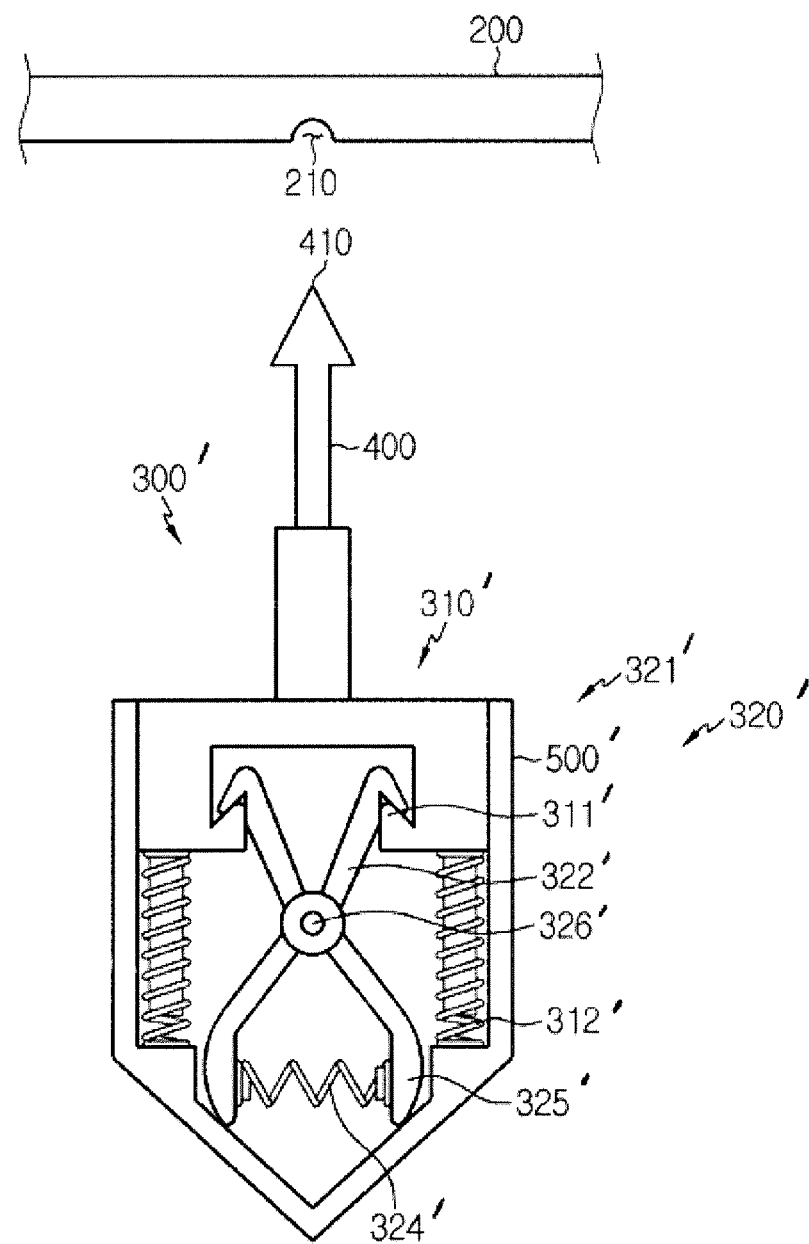

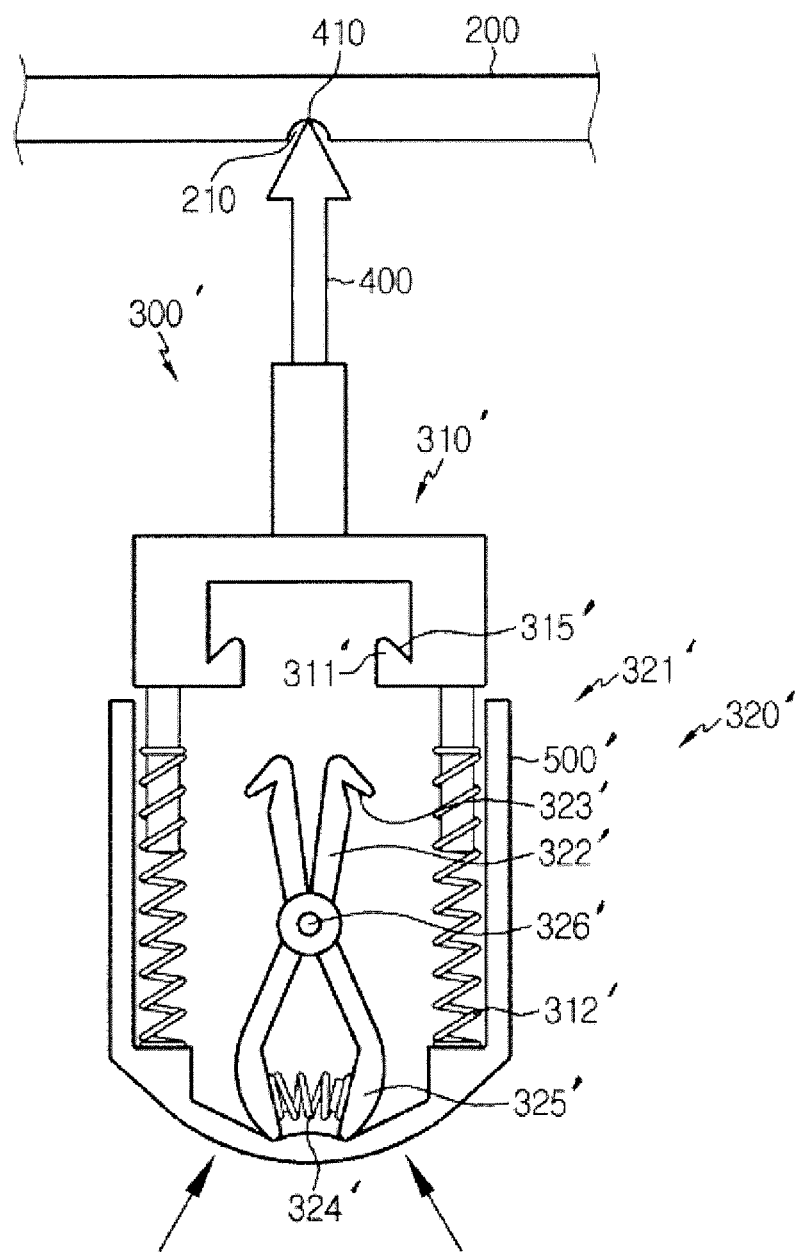

BATTERY MODULE AND BATTERY PACK INCLUDING SAME

TECHNICAL FIELD

The present application claims priority to Korean Patent Application No. 10-2017-0085992 filed on Jul. 6, 2017 in the Republic of Korea, the disclosures of which are incorporated herein by reference.

The present disclosure relates to a battery module and a battery pack including the battery module, and more particularly, to a battery module capable of preventing the overcharge of a battery cell and a battery pack including the battery module.

BACKGROUND ART

As technology development and demand for a mobile device have increased, demand for a secondary battery as an energy source has rapidly increased. Conventionally, a nickel-cadmium battery or a hydrogen ion battery has been used as the secondary battery. However, a lithium secondary battery is recently widely used because charging and discharging is free due to rare memory effect in comparison with a nickel-based secondary battery, a self-discharge rate is very low, and an energy density is high.

The lithium secondary battery mainly uses a lithium oxide and a carbonaceous material as a positive electrode active material and a negative electrode active material, respectively. The lithium secondary battery includes an electrode assembly in which a positive electrode plate and a negative electrode plate, respectively coated with the positive electrode active material and the negative electrode active material, are arranged with a separator therebetween, and an outer member, that is a battery case, which seals and receives the electrode assembly together with an electrolyte solution.

The lithium secondary battery includes a positive electrode, a negative electrode, and a separator interposed therebetween and an electrolyte. Depending on which material is used for the positive electrode active material and the negative electrode active material, the lithium secondary battery is classified into a lithium ion battery (LIB) and a polymer lithium ion battery (PLIB). Generally, an electrode of the lithium secondary battery is prepared by applying the positive or negative electrode active material to a current collector made of aluminum or copper sheet, mesh, film, foil, or the like and then drying the same.

In relation to the conventional battery module, there is known a technique of preventing overcharge based on a voltage and breaking a voltage through a battery management system (BMS) when the voltage measured by a sensor is an overvoltage. However, this conventional technique has a problem because overcharge cannot be prevented when the BMS operates abnormally.

DISCLOSURE

Technical Problem

The present disclosure is directed to providing a battery module capable of preventing the overcharge of a battery cell regardless of a BMS, such as when an error occurs in the BMS, and a battery pack including the battery module.

In addition, the present disclosure is directed to providing a battery module capable of preventing the overcharge of a battery cell by using the pressure generated when the overcharge occurs at the battery cell, and a battery pack including battery module.

Technical Solution

In one aspect of the present disclosure, there is provided a battery module, comprising: a battery cell stack having a plurality of stacked battery cells stacked, each battery cell having an electrode lead; a bus bar configured to electrically connect the electrode leads of the plurality of stacked battery cells; and a breaking unit disposed between two adjacent battery cells of the plurality of stacked battery cells, the breaking unit being spaced apart from the bus bar, and the breaking unit being configured to operate by a gas pressure of gas generated in at least one of the two adjacent battery cells to break the electric connection between the electrode leads of the two adjacent battery cells and the bus bar.

Also, the breaking unit may include: an operation body having a holding portion; a first elastic member being coupled to the operation body; a fixing member hooked to the holding portion of the operation body to fix the operation body in a state where the first elastic member is elastically contracted by the operation body; and a second elastic member being coupled to the fixing member to releasably maintain the operation body in the fixed state.

In addition, the battery module may further comprise a fracture member coupled to the operation body to face the bus bar and having a sharp tip portion formed to face the bus bar.

Also, a fracture groove may be formed at the bus bar, and the sharp tip portion of the fracture member may be disposed to face the fracture groove of the bus bar.

In addition, a first inclined portion may be formed at the holding portion of the operation body to be inclined upwards from an inside of the operation body toward an outside thereof, and the first elastic member may be coupled to a lower side of a center of the operation body.

Also, the fixing member may include: a pivoting portion having a second inclined portion corresponding to the first inclined portion to contact the first inclined portion of the holding portion, the second elastic member being coupled to the pivoting portion; and a pivotal shaft coupled to the pivoting portion.

In addition, the pivoting portion may include a first pivoting portion at which the second inclined portion is formed and to which the second elastic member is coupled; and a second pivoting portion extending from the first pivoting portion and pressed by one of the two adjacent battery cells.

Also, the pivoting portion may be provided in as a pair, and each pivoting portion of the pair of pivoting portions is disposed at opposite sides of the operation body, respectively, so that the operation body is disposed between the pair of pivoting portions.

In addition, a first inclined portion may be formed at the holding portion of the operation body to be inclined downward from an inside of the operation body toward an outside thereof, the first elastic member may be provided as a pair, and each of the first elastic members of the pair of first elastic members may be coupled to lower sides of opposite sides of the operation body.

Also, the fixing member may include: a pivoting portion having a second inclined portion corresponding to the first inclined portion to contact the first inclined portion of the holding portion, the second elastic member being coupled to the pivoting portion; and a pivotal shaft coupled to the pivoting portion.

In addition, the pivoting portion may include a first pivoting portion at which the second inclined portion is formed; and a second pivoting portion extending from the first pivoting portion, the second pivoting portion being coupled with the second elastic member and pressed by one of the two adjacent battery cells.

Also, the pivoting portion may be provided as a pair, and one of the pivoting portions of the pair of pivoting portions may be disposed to cross another of the pivoting portions of the pair of pivoting portions at the pivotal shaft on the basis of the pivotal shaft.

In addition, the battery module may further comprise a support member disposed between the two adjacent battery cells so that the breaking unit is supported in contact with the support member.

Also, each battery cell may include a terrace portion at which the electrode lead is disposed and supported, and the breaking unit may be installed at the terrace portion of the two adjacent battery cells.

Meanwhile, in another aspect of the present disclosure, there is also provided a battery pack including the battery module described above, and there is also provided a vehicle including the battery module.

Advantageous Effects

According to the embodiments of the present disclosure, since a breaking unit for breaking electric connection between the electrode lead and the bus bar operates when the battery cell is overcharged, it is possible to prevent the overcharge of the battery cell regardless of a BMS, such as when the BMS malfunctions and thus it is impossible or difficult to control the overcharge.

In addition, since the force is stored in the elastic member elastically contracted and the pressure generated when the battery cell is overcharged may act as a trigger of the elastic member, it is possible to prevent the overcharge of the battery cell.

DESCRIPTION OF DRAWINGS

FIGS. 5 and 6 are diagrams for illustrating an operating process of a breaking unit at the battery module according to the second embodiment of the present disclosure.

BEST MODE

Figure 1:
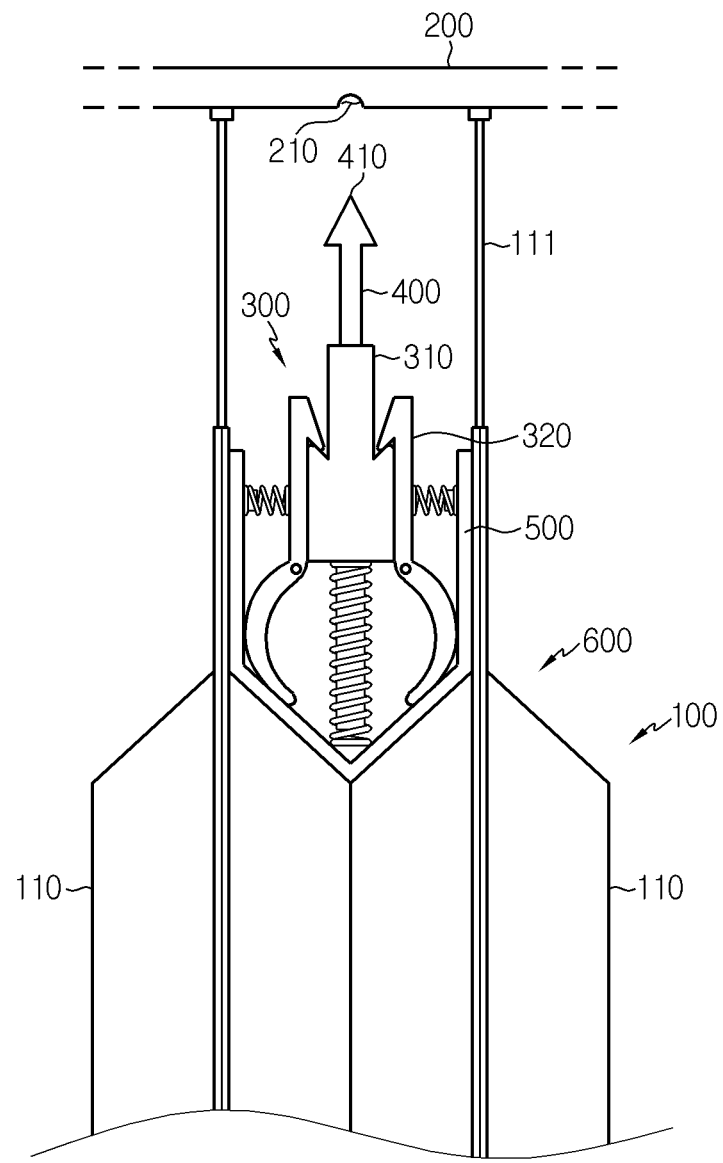
FIG. 1 is a cross-sectioned view showing a portion of a battery module according to the first embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

The term, 'combine' or 'connect' as used herein, may refer not only to a case where one member and another member are directly combined or directly connected but also a case where one member is indirectly combined with another member via a connecting member or is indirectly connected.

Figure 2:
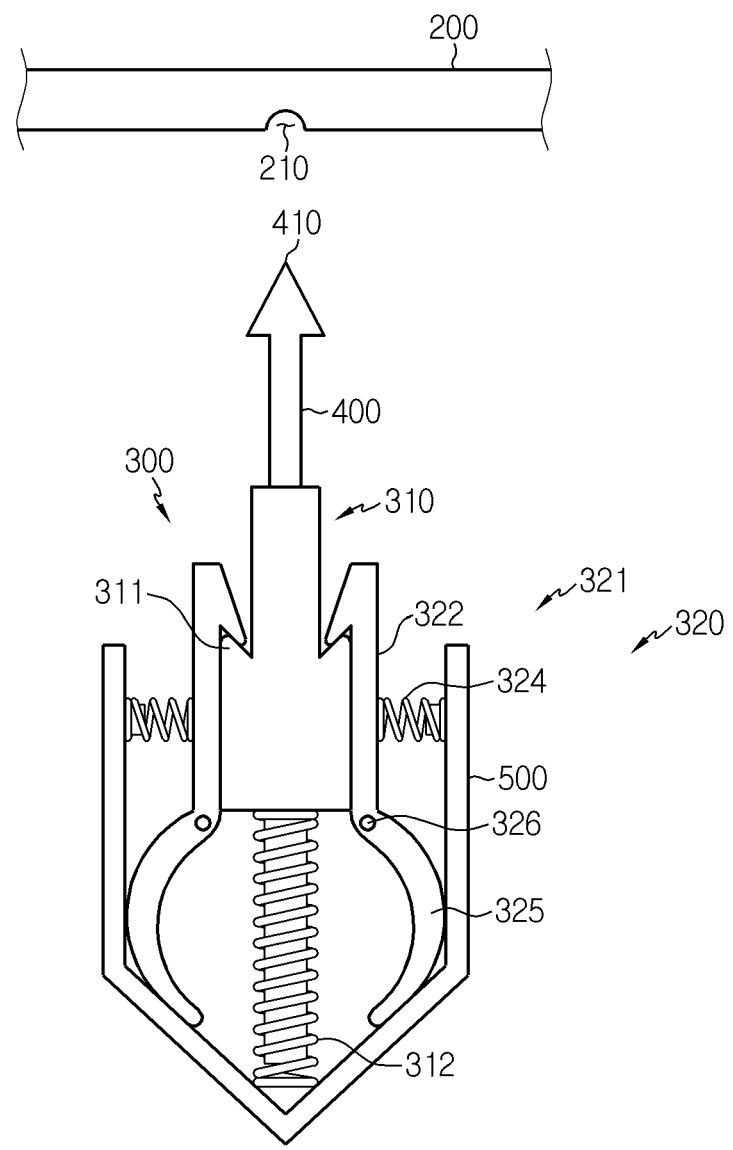
FIGS. 2 and 3 are diagrams for illustrating an operating process of a breaking unit at the battery module according to the first embodiment of the present disclosure.
Figure 3:
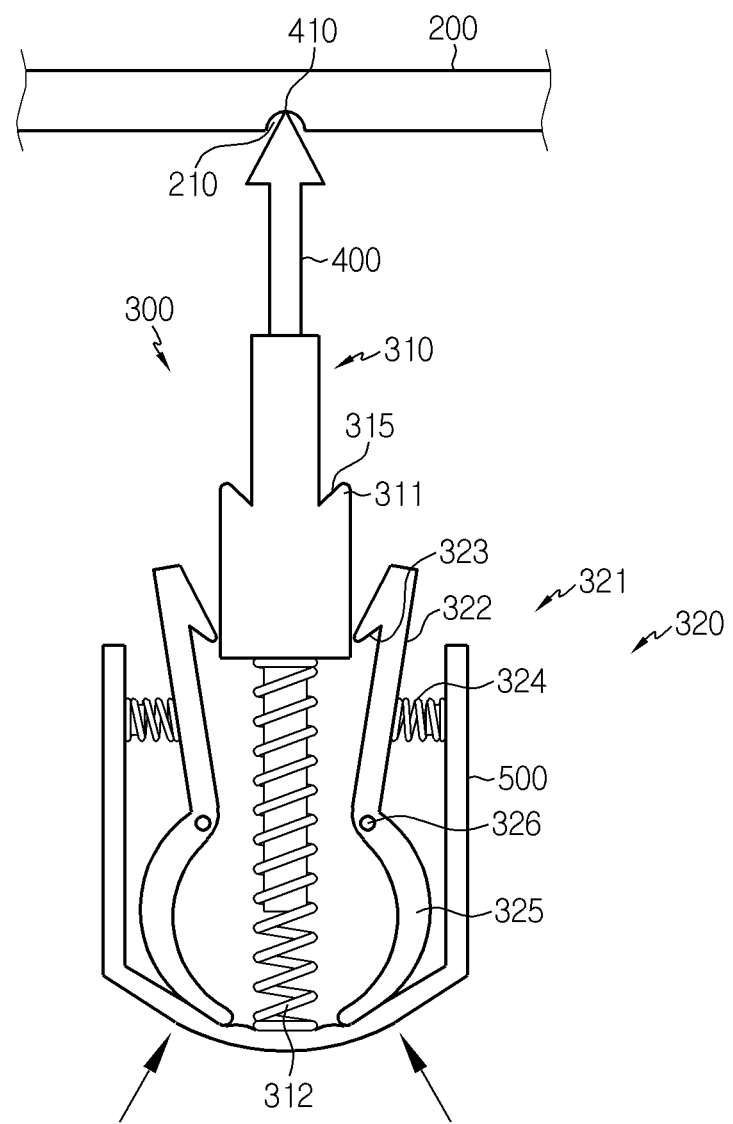

FIG. 1 is a cross-sectioned view showing a portion of a battery module according to the first embodiment of the present disclosure, and FIGS. 2 and 3 are diagrams for illustrating an operating process of a breaking unit at the battery module according to the first embodiment of the present disclosure.

Referring to FIGS. 1 to 3, a battery module according to the first embodiment of the present disclosure includes a battery cell stack 100, a bus bar 200 and a breaking unit 300.

The battery cell stack 100 may be configured so that a plurality of battery cells 110 are stacked therein (see FIG. 1). The battery cells 110 may have various structures, and the plurality of battery cells 110 may be stacked in various ways. The battery cell 110 may be configured so that a plurality of unit cells, in each of which a positive electrode plate, a separator and a negative electrode plate are arranged in order, or a plurality of bi-cells, in each of which a positive electrode plate, a separator, a negative electrode plate, a separator, a positive electrode plate, a separator and a negative electrode plate are arranged in order, are stacked suitable for a battery capacity.

The battery cell 110 may have an electrode lead 111. The electrode lead 111 is a type of terminal that is exposed to the outside and connected to an external device and may be made of a conductive material. The electrode lead 111 may include a positive electrode lead and a negative electrode lead. The positive electrode lead and the negative electrode lead may be disposed in opposite directions with respect to the longitudinal direction of the battery cell 110, or the positive electrode lead and the negative electrode lead may be positioned in the same direction with respect to the longitudinal direction of the battery cell 110. The electrode lead 111 may be electrically coupled to the bus bar 200, explained later. If the battery cell 110 is charged or discharged, gas is generated inside the case of the battery cell 110, and the gas may be collected in a gas collector (not shown) disposed near a terrace portion 600 where the electrode lead 111 of the battery cell 110 is provided and supported. Also, the breaking unit 300 may be installed at the terrace portion 600 which is swollen by the gas collected in the gas collector (not shown) at overcharge. That is, the breaking unit 300 may be operated by the gas pressure applied to the breaking unit 300 at the terrace portion 600. The case of the battery cell 110 may have various types. For convenience of explanation, the case of the battery cell 110 will be described as a pouch-type case.

The battery cell stack 100 may include a plurality of cartridges (not shown) for accommodating the battery cells 110. Each cartridge (not shown) may be fabricated by injection-molding plastic, and a plurality of cartridges (not shown) having an accommodation portion for accommodating the battery cell 110 may be stacked. A cartridge assembly in which a plurality of cartridges (not shown) are stacked may include a connector element or a terminal element. The connector element may include various types of electrical connecting components or connecting components for connecting to, for example, a battery management system (BMS) (not shown) capable of providing data on voltage or temperature of the battery cells 110. In addition, the terminal element includes a positive electrode terminal and a negative electrode terminal as main terminals connected to the battery cell 110, and the terminal element may have a terminal bolt to be electrically connected to the outside. Meanwhile, the battery cell 110 may have various shapes.

The bus bar 200 is coupled to the electrode leads 111 respectively provided at the plurality of battery cells 110 to electrically connect the electrode leads 111. Here, the electric connection may include serial or parallel connection. The bus bar 200 and the electrode lead 111 may be connected in various ways, for example by welding. A fracture groove 210 may be formed at the bus bar 200 so that the bus bar 200 may be easily fractured when an overcharge occurs at the battery cell 110. This will be described in detail later.

The support member 500 is disposed between the plurality of battery cells 110, and the breaking unit 300 may be supported in contact with the support member 500. That is, referring to FIG. 1, the support member 500 may be coupled to the terrace portion 600 between one battery cell 110 and another battery cell 110 adjacent to one battery cell 110, and the breaking unit 300, explained later, may be coupled to and supported by the support member 500. Here, the support member 500 may be configured in various manners, for example an interconnector provided at the battery module. Here, the interconnector is disposed around the battery cells 110 and transmits an electric signal corresponding to the temperature of the battery cell 110 or an electric signal corresponding to the current or voltage of the battery cell 110 to the BMS while the battery cell is repeatedly charged or discharged. In the present disclosure, the breaking unit 300 may be coupled to the interconnector. However, the support member 500 does not necessarily have to be an interconnector.

The breaking unit 300 is provided to operate by the gas pressure of the gas generated in the battery cell 110 when the battery cell 110 is charged or discharged, or particularly overcharged. That is, if the gas is generated in the case of the battery cell 110 as described above, the gas is collected in the gas collector (not shown) disposed near the terrace portion 600 where the electrode lead 111 of the battery cell 110 is provided and supported, and thus the breaking unit 300 may be disposed between the plurality of battery cells 110 at a location close to the terrace portion 600 where the gas collector (not shown) is located, at this time to be spaced apart from the bus bar 200. However, if the gas collector (not shown) is away from the terrace portion 600, the position of the breaking unit 300 may be changed to be adjacent to the gas collector (not shown). Also, the breaking unit 300 may operate by the gas pressure of the gas generated when the battery cell 110 is overcharged, to break the electrical connection between the electrode lead 111 and the bus bar 200. By doing so, it is possible to prevent the overcharge of the battery cell 110 regardless of the BMS.

The breaking unit 300 may include an operation body 310 and a fixing member 320. Referring to FIGS. 2 and 3, a holding portion 311 may be formed at the operation body 310 and a first elastic member 312 may be coupled thereto. The fixing member 320 is hooked to the holding portion 311 of the operation body 310 to fix the operation body 310 so that the operation body 310 may keep elastically contracted by the first elastic member 312. Here, a second elastic member 324 is coupled to the fixing member 320 so that the fixing member 320 keeps hooked to the holding portion 311 of the operation body 310 and fixed to the operation body 310. Here, the operation body 310 coupled to the first elastic member 312 in a state where the first elastic member 312 is elastically contracted is hooked and fixed to the fixing member 320. That is, referring to FIGS. 1 and 2, the operation body 310 is hooked and fixed to the fixing member 320 in a state where the first elastic member 312 is elastically contracted. In addition, if gas is generated in the battery cell 110 due to overcharge, the gas pressure is transmitted to the fixing member 320 of the breaking unit 300, so that the fixing member 320 pivots while overcoming the elastic force of the second elastic member 324. If so, the operation body 310 hooked to the fixing member 320 is released, so that the operation body 310 is fired toward the bus bar 200 due to the elastic recovery force of the first elastic member 312. Due to the firing force of the operation body 310, the operation body 310 collides with the bus bar 200 to fracture the bus bar 200 or fracture a connecting portion of the bus bar 200 and the electrode lead 111. To this end, a fracture member 400 may be coupled to the operation body 310. That is, the fracture member 400 may be coupled to the operation body 310 to face the bus bar 200 and have a sharp tip portion 410 facing the bus bar 200. Here, if the operation body 310 is fired, the fracture member 400 having the sharp tip portion 410 may collide with the bus bar 200 to fracture the bus bar 200 itself or the connection portion between the bus bar 200 and the electrode lead 111. If the fracture member 400 is not provided and only the operation body 310 is provided, the operation body 310 may collide with the bus bar 200 to fracture the bus bar 200 itself or the connection portion between the bus bar 200 and the electrode lead 111. The fracture groove 210 may be formed at the bus bar 200 so that the bus bar 200 itself may be easily fractured. The fracture groove 210 may have various shapes or various sizes. If the fracture groove 210 is formed at the bus bar 200, the sharp tip portion 410 of the fracture member 400 may be disposed to face the fracture groove 210 of the bus bar 200. That is, if the operation body 310 is fired, the sharp tip portion 410 of the fracture member 400 may collide with the fracture groove 210 of the bus bar (see FIG. 3) to fracture the bus bar 200 about the fracture groove 210 of the bus bar 200.

Referring to FIGS. 2 and 3, the hooked portion 311 of the operation body 310 may have a first inclined portion 315 that is inclined upwards from the inside of the operation body 310 toward the outside thereof. Here, the first inclined portion 315 may be formed to be hooked to a second inclined portion 323 formed at the pivoting portion 321 of the fixing member 320. In addition, the first elastic member 312 is coupled to a lower side of the center of the operation body 310 and the holding portion 311 of the operation body 310 is hooked and fixed to the fixing member 320 in a state where the first elastic member 312 is elastically contracted.

The fixing member 320 may include a pivoting portion 321 and a pivotal shaft 326. The pivoting portion 321 may include a first pivoting portion 322 at which the second inclined portion 323 corresponding to the first inclined portion 315 to contact the first inclined portion 315 of the holding portion 311 is formed and to which the second elastic member 324 is coupled, and a second pivoting portion 325 extending from the first pivoting portion 322 and pressed by the battery cell 110. That is, since the second inclined portion 323 of the fixing member 320 is hooked to the first inclined portion 315 formed at the holding portion 311 of the operation body 310 in a state where the first elastic member 312 is elastically contracted, the operation body 310 is fixed as shown in FIG. 2. In addition, the first elastic member 312 may be in contact with the support member 500. Here, the pivoting portion 321 may be provided in a pair, and the pair of pivoting portions 321 may be disposed at both sides of the operation body 310, respectively. By doing so, the operation body 310 may be disposed between the pair of pivoting portions 321. Here, the second elastic member 324 and the second pivoting portion 325 may contact the support member 500. The pivotal shaft 326 may be coupled to the pivoting portion 321. That is, the pivoting portion 321 may pivot relative to the pivotal shaft 326. Namely, if gas is generated due to the overcharge of the battery cell 110, gas pressure is generated near the terrace portion 600 of the battery cell 110, so that the gas pressure is applied to the second pivoting portion 325 to press the second pivoting portion 325. In addition, if the second pivoting portion 325 pivots relative to the pivotal shaft 326, the first pivoting portion 322 extending from the second pivoting portion 325 also pivots, and the second inclined portion 323 of the first pivoting portion 322 moves along the first inclined portion 321 of the holding portion 311 of the operation body 310. If the second inclined portion 323 moves and is released from the first inclined portion 315, the operation body 310 is fired toward the bus bar 200 due to the elastic recovery force of the first elastic member 312, and the sharp tip portion 410 of the fracture member 400 coupled to the operation body 310 collides with the fracture groove 210 of the bar 200 and fractures the bus bar 200, or the operation body 310 to the fracture member 400 collides with the bus bar 200 to break the electrical connection between the bus bar 200 and the electrode lead 111.

Hereinafter, the operation and effect of the battery module according to the first embodiment of the present disclosure will be described with reference to the drawings.

Referring, to FIGS. 1 and 2, the breaking unit 300 is disposed between the plurality of battery cells 110, and the operation body 310 of the breaking unit 300 is fixed by the fixing member 320 in a state where the first elastic member 312 is elastically contracted. Here, the second inclined portion 323 is formed at the first pivoting portion 322 of the fixing member 320, and the second inclined portion 323 is hooked to the first inclined portion 315 formed at the holding portion 311 of the operation body 310, thereby fixing the operation body 310. Referring to FIG. 3, if gas is generated in the battery cell 110 due to overcharge or the like, the pivoting portion 321 of the fixing member 320 pivots based on the pivotal shaft 326 due to the gas pressure, and if the pivoting portion 321 pivots, the operation body 310 is released and thus fired. In addition, the operation body 310 collides with the bus bar 200, or the fracture member 400 coupled to the operation body 310 collides with the bus bar 200, thereby fracturing the bus bar 200 itself or fracturing the connection portion between the bus bar 200 and the electrode lead 111 to prevent the battery cell 110 from being overcharged.

Since the battery module according to the first embodiment of the present disclosure uses the first elastic member 312 and the second elastic member 324, it is possible to amplify the force as great as fracturing the bus bar 200 itself or the connection portion between the bus bar 200 and the electrode lead 111.

Figure 4:
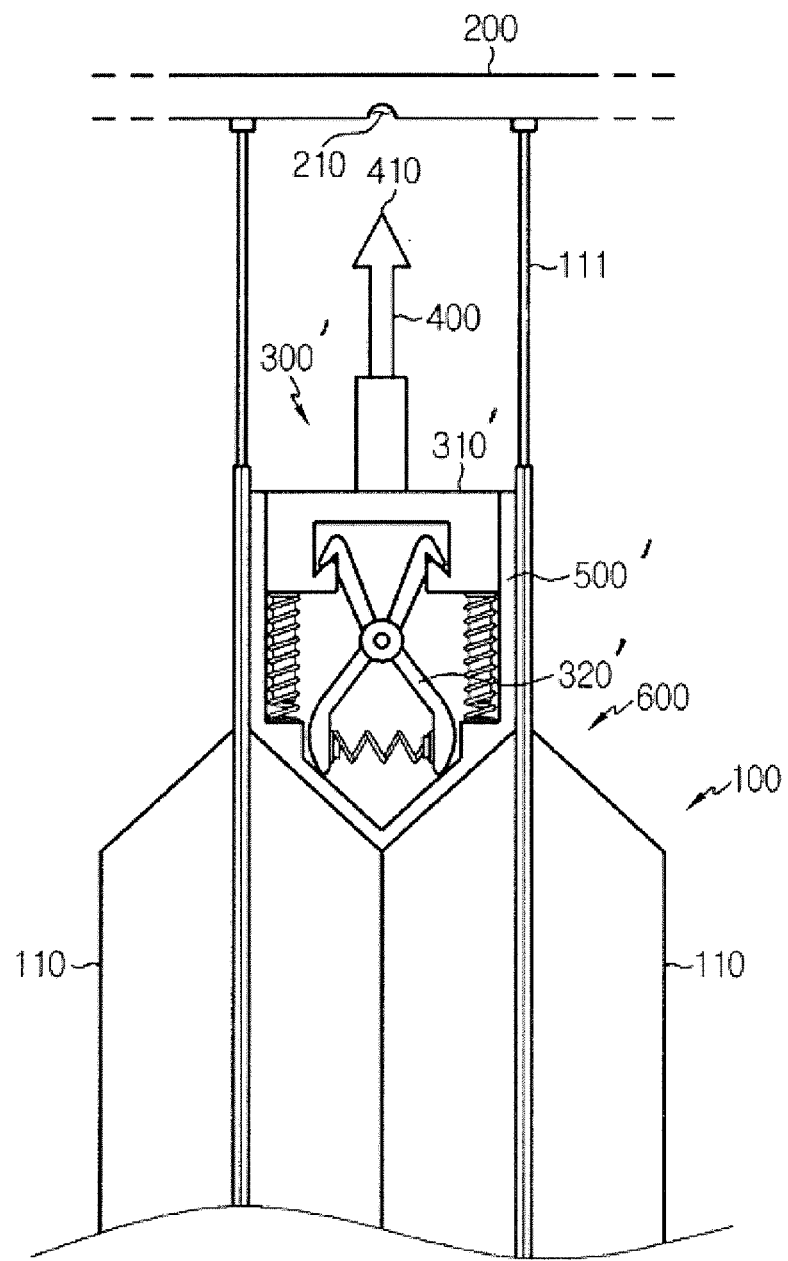
FIG. 4 is a cross-sectioned view showing a portion of a battery module according to the second embodiment of the present disclosure.

FIG. 4 is a cross-sectioned view showing a portion of a battery module according to the second embodiment of the present disclosure, and FIGS. 5 and 6 are diagrams for illustrating an operating process of a breaking unit at the battery module according to the second embodiment of the present disclosure.

Hereinafter, the function and effect of a battery module according to the second embodiment according to the present disclosure will be described with reference to the drawings, but features common to the battery module according to the first embodiment of the present disclosure will not be described again in detail.

The second embodiment of the present disclosure is different from the first embodiment in the point that the detailed shape of the breaking unit 300 is different.

Referring to FIGS. 4 to 6, the first inclined portion 315' is formed at the holding portion 311' of the operation body 310' so as to be inclined downward from the inside of the operation body 310' toward the outside thereof, and the first elastic member 312' may be coupled to lower sides of both ends of the operation body 310', respectively. Here, the first elastic member 312' may be elastically contracted in contact with the support member 500', similar to the first embodiment.

In addition, the fixing member 320' may include a pivoting portion 321' and a pivotal shaft 326'. The pivoting portion 321' may include a second inclined portion 323' corresponding to the first inclined portion 315' to be in contact with the first inclined portion 315' of the holding portion 311', and the second elastic member 324' may be coupled thereto. Here, the pivoting portion 321' may include a first pivoting portion 322' at which the second inclined portion 323' is formed, and a second pivoting portion 325' extending from the first pivoting portion 322', coupled with the second elastic member 324' and pressed by the battery cell 110'. The pivoting portion 321' may be provided in a pair, similar to the first embodiment, but its structure is different from that of the first embodiment. Referring to FIGS. 5 and 6, the pair of pivoting portions 321' may be disposed to cross each other at the pivotal shaft 326' on the basis of the pivotal shaft 326'.

Here, the basic operation of the breaking unit 300' according to the second embodiment is common to that of the breaking unit 300 of the first embodiment, and thus a detailed description thereof is replaced with that of the first embodiment.

Meanwhile, a battery pack (not shown) according to an embodiment of the present disclosure, may include one or more battery modules according to an embodiment of the present disclosure as described above. Also, in addition to the battery modules, the battery pack (not shown) may further includes a case for accommodating the battery modules, and various devices for controlling charge and discharge of the battery modules, such as a BMS, a current sensor, a fuse, and the like.

Meanwhile, a vehicle (not shown) according to an embodiment of the present disclosure may include the battery module or the battery pack (not shown) described above, and the battery pack (not shown) may include the battery module. In addition, the battery module according to an embodiment of the present disclosure may be applied to the vehicle (not shown), for example, a predetermined vehicle (not shown) provided to use electricity like an electric vehicle or a hybrid electric vehicle.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure is directed to a battery module and a battery pack including the battery module and is particularly applicable to industries associated with a secondary battery.

What is claimed is:

1. A battery module, comprising:
   a battery cell stack having a plurality of stacked battery cells, each battery cell having an electrode lead;
   a bus bar configured to electrically connect the electrode leads of the plurality of stacked battery cells; and
   a breaking unit disposed between two adjacent battery cells of the plurality of stacked battery cells, the breaking unit being spaced apart from the bus bar, and the breaking unit being configured to operate by a gas pressure of gas generated in at least one of the two adjacent battery cells to break the electric connection between the electrode leads of the two adjacent battery cells and the bus bar.

2. The battery module according to claim 1,
   wherein the breaking unit includes:
   an operation body having a holding portion;
   a first elastic member being coupled to the operation body;
   a fixing member hooked to the holding portion of the operation body to fix the operation body in a state where the first elastic member is elastically contracted by the operation body; and
   a second elastic member being coupled to the fixing member to releasably maintain the operation body in the fixed state.

3. The battery module according to claim 2, further comprising:
   a fracture member coupled to the operation body to face the bus bar and having a sharp tip portion formed to face the bus bar.

4. The battery module according to claim 3,
   wherein a fracture groove is formed at the bus bar, and
   wherein the sharp tip portion of the fracture member is disposed to face the fracture groove of the bus bar.

5. The battery module according to claim 2,
   wherein a first inclined portion is formed at the holding portion of the operation body to be inclined upwards from an inside of the operation body toward an outside thereof, and
   wherein the first elastic member is coupled to a lower side of a center of the operation body.

6. The battery module according to claim 5,
   wherein the fixing member includes:
   a pivoting portion having a second inclined portion corresponding to the first inclined portion to contact the first inclined portion of the holding portion, the second elastic member being coupled to the pivoting portion; and
   a pivotal shaft coupled to the pivoting portion.

7. The battery module according to claim 6,
   wherein the pivoting portion includes:
   a first pivoting portion at which the second inclined portion is formed and to which the second elastic member is coupled; and
   a second pivoting portion extending from the first pivoting portion and pressed by one of the two adjacent battery cells.

8. The battery module according to claim 6,
   wherein the pivoting portion is provided in as a pair, and
   wherein each pivoting portion of the pair of pivoting portions are is disposed at opposite sides of the operation body, respectively, so that the operation body is disposed between the pair of pivoting portions.

9. The battery module according to claim 2,
   wherein a first inclined portion is formed at the holding portion of the operation body to be inclined downward from an inside of the operation body toward an outside, thereof,
   wherein the first elastic member is provided as a pair; and
   wherein each of the first elastic members of the pair of first elastic members is coupled to lower sides of opposite sides of the operation body.

10. The battery module according to claim 9,
    wherein the fixing member includes:
    a pivoting portion having a second inclined portion corresponding to the first inclined portion to contact the first inclined portion of the holding portion, the second elastic member being coupled to the pivoting portion; and
    a pivotal shaft coupled to the pivoting portion.

11. The battery module according to claim 10,
    wherein the pivoting portion includes:
    a first pivoting portion at which the second inclined portion is formed; and
    a second pivoting portion extending from the first pivoting portion, the second pivoting portion being coupled with the second elastic member and pressed by one of the two adjacent battery cells.

12. The battery module according to claim 10,
    wherein the pivoting portion is provided in as a pair, and
    wherein one of the pivoting portions of the pair of pivoting portions is disposed to cross another of the pivoting portions of the pair of pivoting portions at the pivotal shaft on the basis of the pivotal shaft.

13. The battery module according to claim 1, further comprising:
    a support member disposed between the two adjacent battery cells so that the breaking unit is supported in contact with the support member.

14. The battery module according to claim 1,
    wherein each battery cell includes a terrace portion at which the electrode lead is disposed and supported, and
    wherein the breaking unit is installed at the terrace portions of the two adjacent battery cells.

15. A battery pack comprising a battery module defined in claim 1.

16. A vehicle comprising a battery module defined in claim 1.

* * * * *